United States Patent
Nakayama et al.

[11] Patent Number: 5,986,760
[45] Date of Patent: Nov. 16, 1999

[54] SHAPE MEASUREMENT METHOD AND HIGH-PRECISION LENS MANUFACTURING PROCESS

[75] Inventors: Shigeru Nakayama, Kawasaki; Takashi Genma, Tokyo; Tetsuji Onuki, Yokohama; Masami Ebi, Musashino; Hajime Ichikawa, Yokohama, all of Japan

[73] Assignee: Nikon Corporation, Tokyo, Japan

[21] Appl. No.: 09/097,578

[22] Filed: Jun. 12, 1998

[30] Foreign Application Priority Data

Jun. 12, 1997 [JP] Japan ..................................... 9-169670
May 26, 1998 [JP] Japan .................................... 10-160027

[51] Int. Cl.⁶ ...................................................... G01B 9/02

[52] U.S. Cl. ........................................... 356/359; 356/360

[58] Field of Search ...................................... 356/359, 360

[56] References Cited

U.S. PATENT DOCUMENTS 5,416,586  5/1995  Tronolone et al. ...................... 356/359

Primary Examiner—Robert H. Kim
Attorney, Agent, or Firm—Downs Rachlin & Martin PLLC

[57] ABSTRACT

A method of measuring a surface shape of a target surface, and a lens manufacturing process for manufacturing a lens having a surface shape figured to high-precision. The method and process includes the steps of first, interferometrically measuring the surface shape of the target surface or the lens surface. Then second, measuring a surface shape of a prototype target surface. Then third, determining a rotationally symmetric error component of the difference between the target surface shape or the lens surface shape and the prototype target surface shape. Then fourth, expressing the rotationally symmetric error as a sum of two components, one being slowly varying and the other being a remainder. The slowly varying component is at least determined by performing the third step, while the remainder component is determined by performing the first step.

11 Claims, 5 Drawing Sheets

5,986,760

SHAPE MEASUREMENT METHOD AND HIGH-PRECISION LENS MANUFACTURING PROCESS

FIELD OF THE INVENTION

The present invention pertains to a high-precision lens manufacturing process and a shape measurement method for measuring with high precision the surface shape of a lens, mirror, or other such optical element or the like.

BACKGROUND OF THE INVENTION

Fizeau interferometers and the like have conventionally been employed in the measurement of surface shape through the use of interference of light. Among surface shape measurement applications, and particularly for aspheric surface shapes, so-called "null testing" is carried out. In null testing, a measurement light beam is formed using a lens, zone plate, hologram, or other such wavefront formation means for producing a wavefront corresponding to the design surface of the target surface, which may be an aspheric surface. Then, the difference between the target surface and the wavefront of the measurement light beam is measured by causing the measurement light beam, after it has been reflected at the target surface, to interfere with a reference light beam.

In performing surface shape measurements, to know the target surface shape with high precision, it has been necessary to manufacture the wavefront formation means with high precision, and to precisely control the shape of the wavefront of the measurement light beam incident on the target surface. Alternatively, it has been necessary to perform a comparative measurement of the target surface relative to a standard prototype. The standard prototype surface shape is measured beforehand with high precision, using other measurement means.

However, it is difficult to manufacture the lenses and other optical elements constituting the wavefront formation means such that radii of curvature, distances between surfaces, and so forth, of the elements are controlled with a high degree of precision. Moreover, when the target surface is aspheric, it has been difficult to obtain an aspheric prototype measured with high precision, and it is difficult to carry out surface shape measurement with high precision.

SUMMARY OF THE INVENTION

The present invention pertains to a high-precision lens manufacturing process and a shape measurement method for measuring with high precision the surface shape of a lens, mirror, or other such optical element or the like, which may include an aspheric surface.

A first aspect of the invention is a method of measuring a surface shape of a target surface. The first step of the method is interferometrically measuring the surface shape of the target surface. The second step is measuring a surface shape of a prototype target surface. The third step is determining a rotationally symmetric error component of the difference between the target surface shape and the prototype target surface shape. The fourth step is expressing this rotationally symmetric error component as a sum of two components. One of the components is slowly varying with respect to a coordinate on the target surface. The other is a remainder component. The slowly varying component is at least determined by performing the third step, i.e., from the difference between the target and prototype surface shapes. Also, the remainder component is determined by performing the first step, i.e., by the interferometric measurement of the target surface.

In another aspect of the invention, the slowly varying component is an even power series in the coordinate at the target surface and is not higher than fourth order.

In a further aspect of the invention, certified values for the surface shape of the prototype target surface are used in determining the slowly varying component.

In another aspect of the invention, the method described above is used as a lens manufacturing process to manufacture a lens element having a surface figured to high-precision.

DETAILED DESCRIPTION OF THE INVENTION

The present invention pertains to a high-precision lens manufacturing process and a shape measurement method for measuring with high precision the surface shape of a lens, mirror, or other such optical element or the like.

Figure 1:
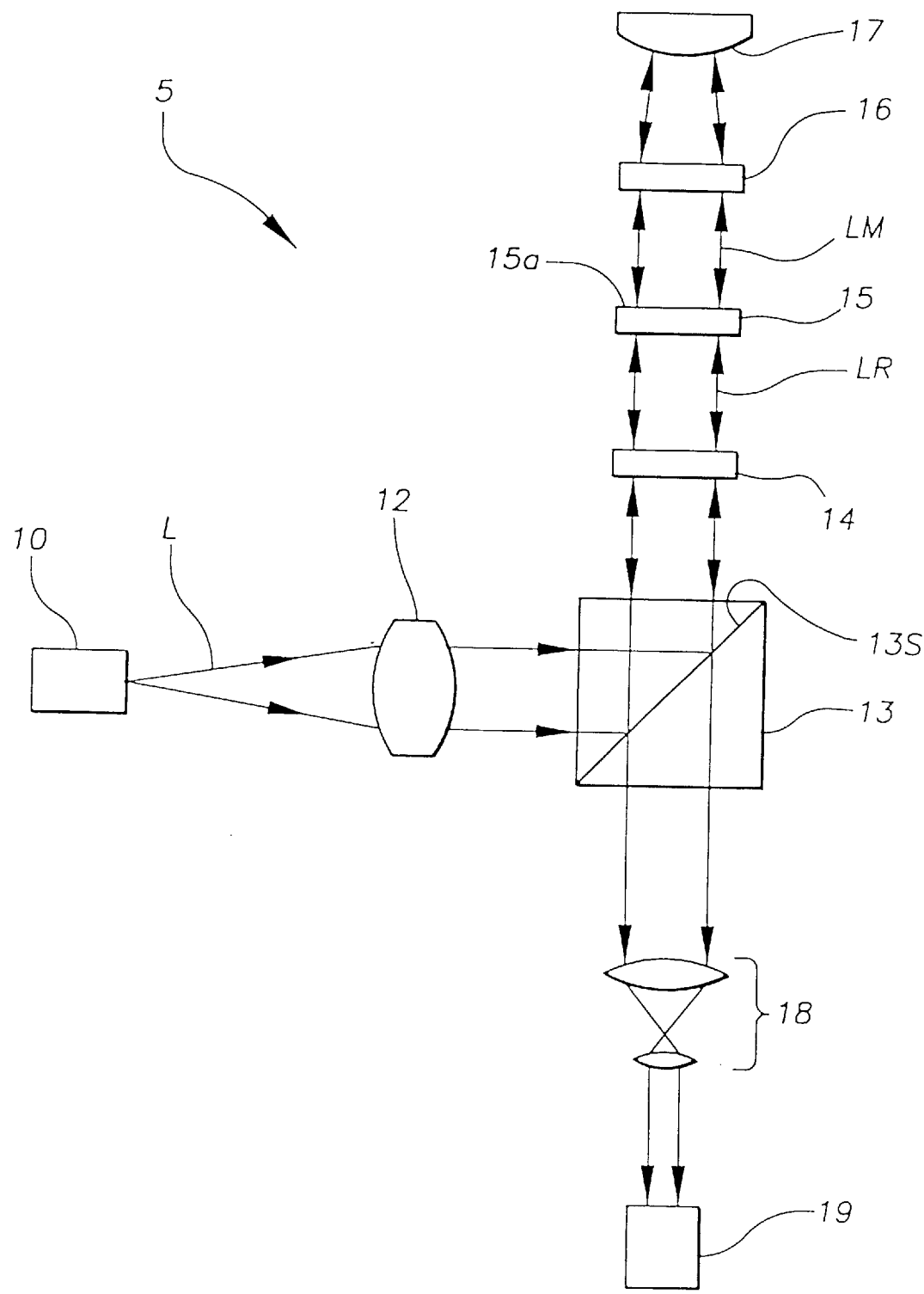
FIG. 1 is a schematic optical diagram of the arrangement of optical elements in a surface shape measurement apparatus used in carrying out the surface shape measurement method and lens manufacturing process of the present invention.

With reference to FIG. 1, surface shape measurement apparatus 5, suitable for measuring the surface shape of an aspheric surface, is constituted from a Fizeau interferometer. A linearly polarized beam L emitted from a light source unit 10 is converted into a collimated light beam at a collimating lens 12, and is incident on a polarizing beam splitter 13. The plane of polarization (not shown) of light beam L is chosen so as to permit reflection at surface 13s of polarizing beam splitter 13. After being reflected at surface 13s of polarizing beam splitter 13, light beam L passes through a quarter-wave plate 14, and is incident on a Fizeau member 15. Light beam L, incident on Fizeau member 15, is split into a measurement light beam LM, which is transmitted through the reference plane (Fizeau plane) 15a of Fizeau member 15, and a reference light beam LR which is reflected by reference plane 15a.

With continuing reference to FIG. 1, measurement light beam LM is incident on a null optical component 16, which serves as a means for forming an aspheric wavefront. Null optical component 16 may comprise a lens, zone plate, or a combination of the two or the like. Measurement light beam LM, upon passing through null optical component 16, is converted into an aspheric wavefront. Measurement light beam LM is then incident on an aspheric target surface 17. Measurement light beam LM is then reflected at aspheric target surface 17, and is again transmitted through component 16 and quarter-wave plate 14, and is incident on polarizing beam splitter 13. Meanwhile, reference light beam LR, reflected by reference plane 15a, also, in similar fashion as measurement light beam LM, is again transmitted through quarter-wave plate 14 and is incident on polarizing beam splitter 13.

Because measurement light beam LM and reference light beam LR are twice transmitted through quarter-wave plate 14 during the course of their round trip away from and back to quarter-wave plate 14, their planes of polarization are rotated by 90°. Thus, they are transmitted through polarizing beam splitter 13. After measurement light beam LM and reference light beam LR are transmitted through polarizing beam splitter 13, their beam diameters are converted at a beam expander 18. Light beams LM and LR are then incident on a two-dimensional image detector 19, where the interference pattern produced by the two beams is detected (or observed).

Apparatus 5 of FIG. 1 is designed such that the aspheric wavefront (not shown) produced by component 16 is normally incident on aspheric target surface 17. Thus, measurement beam LM, after reflecting off aspheric target surface 17, returns backwards along its approach route such that it almost maintains the wavefront shape that it had while traveling forward along its approach route. Accordingly, the wavefront shape of measurement beam LM is almost a plane wave when it interferes with reference light beam LR. Through analysis of the interference pattern between light beams LM and LR, it is possible to measure the difference between the surface shape of the aspheric target surface 17 and the wavefront shape of the aspheric wavefront at the location of aspheric target surface 17.

Figure 2:
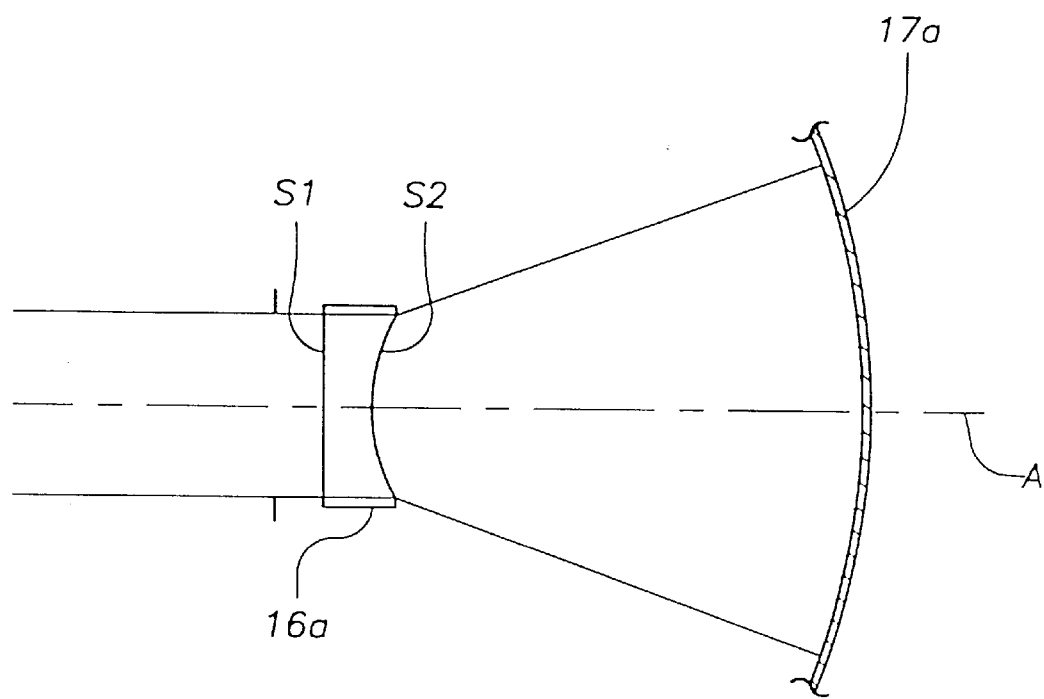
FIG. 2 is a schematic optical diagram showing the arrangement of an aspheric wavefront formation means and an aspheric target surface.

Next, the effect of errors in distances between surfaces or in radii of curvature of lenses contained in the aspheric wavefront formation means (e.g., null optical component 16) on the aspheric wavefront is described. With reference to FIG. 2, there is shown an example of the positional relationship between an example aspheric target surface 17a and an example null optical component as a single lens element 16a, disposed along an axis A. Here, aspheric target surface 17a possesses a shape x, as defined in Table 1, below. Aspheric target surface 17a is presented as an example of aspheric target surface 17, and spherical single lens 16a is presented as an example of null optical element 16 (see FIG. 2).

TABLE 1

Aspheric Surface Data for Aspheric Target Surface 17a.

$x = (y^2/r)/ \{1 + (1 - \kappa(y/r)^2)^{1/2}\} + C4y^4 + \cdots \cdots + C10y^{10}$ (1)

r = −138.00 mm
κ = 3.922
C4 = 0.0
C6 = 3.589 × 10$^{-12}$
C8 = 2.745 × 10$^{-15}$
C10 = 2.862 × 10$^{-19}$

Table 2, below, lists the values of various design parameters for spherical single lens 16a, which serves as an aspheric wavefront formation means. In Table 2, "S" indicates the number of the surface as counted from the light source side, "r" indicates the radius of curvature, "d" indicates the axial distance, and "n" indicates the refractive index at wavelength of 633 nm.

TABLE 2

Design Parameters for Lens 16a

| S | r (mm) | d (mm) | n |
|---|---|---|---|
| 1 | −296.538 | 8.0 | 1.51509 |
| 2 | 31.603 | — | — |

The distance between lens 16a and target surface 17a in the example is 82.5 mm (see FIG. 2).

Figure 3:
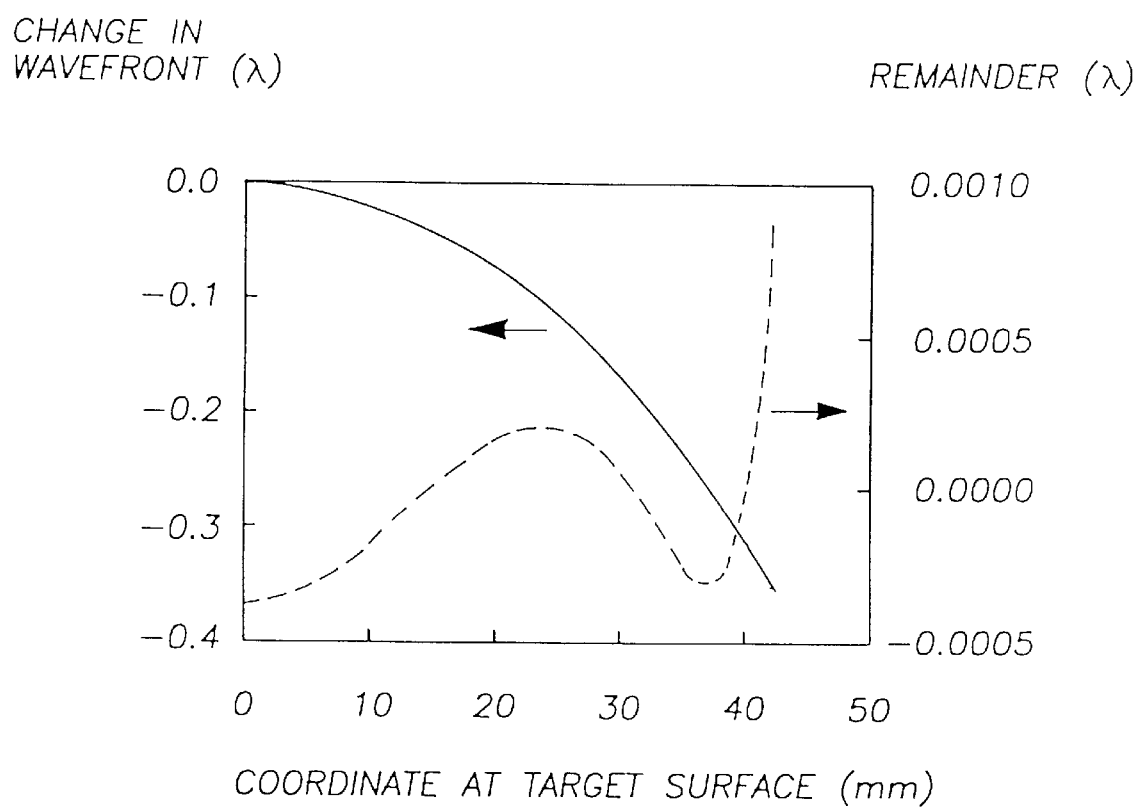
FIG. 3 is a graph depicting the change in aspheric wavefront produced as a result of error in the radius of curvature of the spherical single lens shown in FIG. 2, which serves as the aspheric wavefront formation means.

With reference now to FIG. 3, the solid line indicates the change, in units of measurement wavelengths (λ) (see left vertical axis) in the wavefront at the location of target surface 17a when there is an error corresponding to one Newton's rings fringe in the radius of curvature of second surface S2 of lens 16a. Furthermore, with reference to FIG. 4, the solid line indicates the change, in units of measurement wavelengths (λ) (see left vertical axis), in the wavefront when there is an error of 1 μm in the distance between lens 16a and target surface 17a. In both drawings, the horizontal axis indicates the coordinate at the target surface. As is clear from FIGS. 3 and 4, the change in wavefront produced by such error is large, and an interferometric measurement cannot be carried out with high precision when such an error is present.

However, the majority of this change in the wavefront can be represented by second-order and fourth-order functions of a coordinate at the target surface, using the function δ(y), indicated in Formula (2):

$$\delta(y) = a_2 y^2 + a_4 y^4 \qquad (2)$$

wherein y is the coordinate at the target surface. The parameters $a_2$ and $a_4$ have been adjusted to achieve the best fit to the change in the wavefront in question, and the respective remainders (i.e., fitting errors) are indicated by the broken lines in FIGS. 3 and 4 (see right vertical axes).

Figure 4:
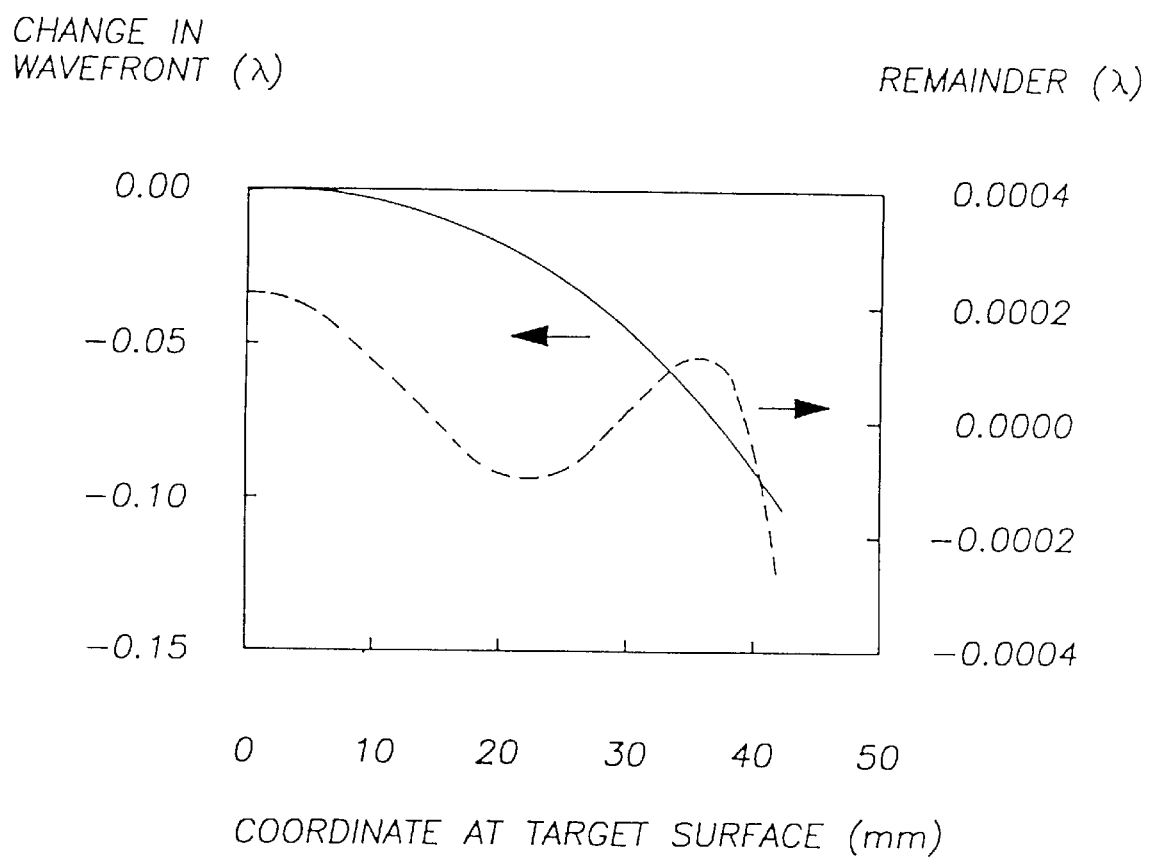
FIG. 4 is a graph depicting the change in aspheric wavefront produced as a result of error in the distance between the spherical single lens, serving as aspheric wavefront formation means, and the aspheric target surface shown in FIG. 2.

As is clear from the broken lines in FIGS. 3 and 4, the remainder is small after the parameters have been adjusted to achieve the best fit. It can be seen that the change in the wavefront produced by an error in distance or radius of curvature r of lens is almost entirely due to components which can be represented as second-order and fourth-order functions, there being almost no change in the higher-order components.

Because of limitations on sampling frequency and so forth, the measurement precision of a typical stylus-type coordinate measuring machine with respect to higher-order surface shape components is not very high. However, lower-order surface shape components can be measured with high precision. Moreover, when lenses or mirrors are used in an optical systems, regardless of whether or not they are aspheric, the bulk of the deterioration in performance due to second-order and fourth-order components of surface shape error can be corrected by adjustment of the distances between the optical components making up the optical system. Accordingly, tolerances for second-order and fourth-order components of error in the shape of the target surface are comparatively lax. It is thus possible to obtain adequate precision therein by carrying out a comparative measurement relative to a standard prototype whose surface shape is certified by means of a stylus-type coordinate measuring machine or the like.

Figure 5:
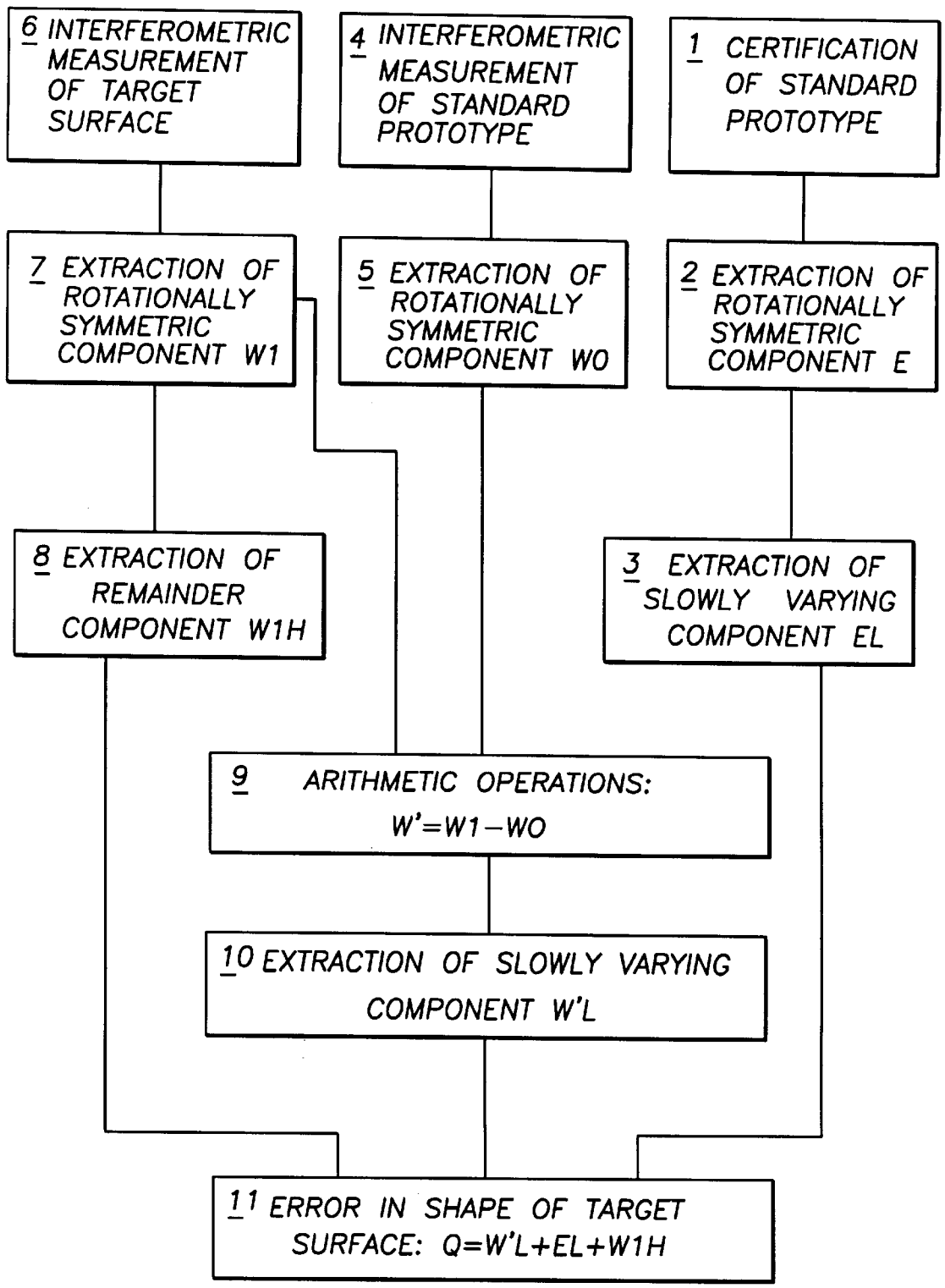
FIG. 5 is a flow diagram of the steps for carrying out the surface shape measurement method and lens manufacturing process of the present invention.

FIG. 5 is a flow diagram showing the preferred steps for carrying out the surface shape measurement method of the present invention. First, in step 1, the surface shape of a standard prototype is measured using a stylus-type coordinate measuring machine or the like, and the difference from design values, i.e., error in shape, of the standard prototype surface.

Next, in steps 2 and 3, arithmetic operations are used to extract components of the error in shape. In step 2, the rotationally symmetric component E of the error in the shape of the prototype is obtained. In step 3, a best fit to the function at Formula (2) is obtained, and, the mathematical representation of the error in shape is then separated into a component containing the second-order and fourth-order (i.e., lower-order or slowly varying components) components EL.

Next, in step 4, the certified prototype is inserted in the optical path of the aspheric shape measurement apparatus, and the difference between the surface shape of the prototype and the wavefront shape of the aspheric wavefront is measured interferometrically. Then, in step 5, arithmetic operations are used to extract the rotationally symmetric component WO thereof. Next, in step 6, the standard prototype is removed from the interferometer, and the aspheric target surface is arranged at the same location as (i.e., at the former location of) the standard prototype. Then, the difference between the surface shape of the aspheric target surface and the wavefront shape of the aspheric wavefront is measured. Then, in step 7, arithmetic operations are used to extract the rotationally symmetric component Wl thereof.

Next, in step 8, a best fit to the function δ(y) of Formula (2) is obtained, and the higher-order component W1H (i.e., the remainder component) of rotationally symmetric component Wl is determined. Then, in step 9, arithmetic operations are then used to determine the difference between the two sets of measurement results; that is, the difference in surface shape between the aspheric target surface and the standard prototype, or W'=Wl—WO. Next, in step 10, a best fit to the function δ(y) of Formula (2) is obtained, and the component containing the second-order and fourth-order components W'L is extracted therefrom. Then, in step 11, using the results of these arithmetic operations, the rotationally symmetric component Q of the error in the shape of the aspheric target surface is determined by means of Formula (3):

$$Q=W'L+EL+W1H. \quad (3)$$

In the discussion above, the error in shape, and differences between surface shape and wavefront shape have been expressed in terms of a coordinate at the target surface. However, any other coordinate system which can be shown to correspond to the coordinate at the target surface may be employed. Furthermore, in determining the second-order and fourth-order components W'L of the difference in surface shape between the aspheric target surface and the prototype (see step 10), the rotationally symmetric components Wl and WO were extracted and a best fit for the difference between the two was obtained. However, one may also determine the difference between the amount by which the target surface is offset relative to the wavefront shape and the amount by which the prototype is offset relative to the wavefront shape, and thereafter extract the rotationally symmetric component thereof, obtain a best fit therefor, and determine second-order and fourth-order components W'L.

Furthermore, in using a polynomial to obtain a best fit for extracting the lower-order components and so forth, the lower-order component δ'(p) of the rotationally symmetric component may also be expressed using the Zernike polynomial indicated in Formula (4):

$$\delta'(p)=b_0+b_1(2p^2-1)+b_2(6p^4-6p^2+1). \quad (4)$$

The measurement procedure in this case is otherwise as described above.

In addition, the lower-order components have been expressed in terms of second-order and fourth-order components, or in terms of the Zernike polynomial shown at Formula (4) in a coordinate at the target surface. This coordinate is normalized to unit aperture radius. However, any other function roughly equivalent thereto may also be used. Where it is possible to separately measure components of order six or higher, measurements may be carried out with the lower-order component understood as including components to this order. It is also possible to manufacture a high-precision lens by measuring shape with high precision using the aforesaid shape measurement method.

As described above, as a result of carrying out a measurement such that the error in the shape of a target surface is divided into a lower-order component and a higher-order component, the present invention permits elimination of manufacturing errors and the like in the wavefront formation means. The present invention also permits high-precision measurement of surface shape, and of an aspheric surface shape in particular. Using the measurement method of the present invention, it is possible to manufacture a high-precision lens as a result of high-precision measurement of the shape of the target surface.

While the present invention has been described in connection with preferred embodiments and examples, it will be understood that it is not limited to those embodiments and examples. On the contrary, it is intended to cover all alternatives, modifications, and equivalents as may be included within the spirit and scope of the invention as defined in the appended claims.

What is claimed is:

1. A method of measuring a surface shape of a target surface, the method comprising the steps of:
   a) interferometrically measuring the surface shape of the target surface;
   b) measuring a surface shape of a prototype target surface;
   c) determining a rotationally symmetric error component of the difference between the target surface shape and said prototype target surface shape; and
   d) expressing said rotationally symmetric error component as a sum of two components, one being a component that varies slowly with respect to a coordinate on said target surface, and the other being a remainder component, wherein said slowly varying component is at least determined by said step c), and said remainder component is determined by said step a).

2. A surface shape measuring method according to claim 1, wherein said slowly varying component comprises an even power series in said coordinate on said target surface, said series being of order not higher than four.

3. A surface shape measurement method according to claim 1, wherein said slowly varying component comprises an even power series in said coordinate on said target surface, said series being of order not higher than six.

4. A surface shape measurement method according to claim 1, wherein said slowly varying component comprises terms of order not higher than that of Zernike polynomial third-order spherical aberration.

5. A surface shape measurement method according to any one of claims 1 through 4, wherein said slowly varying component is determined through further use of certified values obtained from said standard prototype after precalibration thereof.

6. A surface shape measurement method according to any one of claims 1 through 4, wherein said target surface is aspheric in shape.

7. A surface shape measurement method according to claim 5, wherein said target surface is aspheric in shape.

8. A process of manufacturing a lens with a surface, the process comprising the steps of:
   a) interferometrically measuring the surface shape of the lens surface;
   b) measuring a surface shape of a prototype target surface;
   c) determining a rotationally symmetric error component of the difference between the lens surface shape and said prototype target surface shape; and
   d) expressing said rotationally symmetric error component as a sum of two components, one being a component that varies slowly with respect to a coordinate on said target surface, and the other being a remainder component, wherein said slowly varying component is at least determined by said step c), and said remainder component is determined by said step a).

9. A lens manufacturing process according to claim 8, wherein said slowly varying component comprises an even power series in said coordinate on said target surface, said series being of order not higher than four.

10. A lens manufacturing process according to claim 8, wherein said slowly varying component comprises an even power series in said coordinate on said target surface, said series being of order not higher than six.

11. A lens manufacturing process according to claim 8, wherein said slowly varying component comprises terms of order not higher than that of Zernike polynomial third-order spherical aberration.

* * * * *